(12) United States Patent
Marchiraju et al.

(10) Patent No.: US 8,059,616 B1
(45) Date of Patent: Nov. 15, 2011

(54) PARALLEL WIRELESS SCHEDULER

(75) Inventors: Sridhar Marchiraju, Oakland, CA (US); Soshant Bali, Lawrence, KS (US); Hui Zang, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 12/787,251

(22) Filed: May 25, 2010

Related U.S. Application Data

(63) Continuation of application No. 11/769,558, filed on Jun. 27, 2007, now Pat. No. 7,738,485.

(51) Int. Cl.
*H04J 3/22* (2006.01)
(52) U.S. Cl. .................... 370/335; 370/458; 370/468
(58) Field of Classification Search .............. 370/442, 370/443, 456; 455/450–453
See application file for complete search history.

(56) References Cited

U.S. PATENT DOCUMENTS

| | | | | |
|---|---|---|---|---|
| 6,940,824 B2* | 9/2005 | Shibutani | ................ | 370/252 |
| 7,012,910 B2* | 3/2006 | Takeuchi et al. | ............. | 370/335 |
| 7,075,911 B2* | 7/2006 | Bernhard et al. | ............. | 370/331 |
| 7,558,602 B2* | 7/2009 | Kogiantis et al. | ............. | 455/561 |
| 2006/0088055 A1* | 4/2006 | Ishii | ............................ | 370/468 |

OTHER PUBLICATIONS

Bali, Soshant. "A Measurement Study of Scheduler-based Attacks in 3G Wireless Networks." 10 Pages.
Viswanath, Pramod "Opportunistic Beamforming using Dumb Antennas." 39 Pages.

* cited by examiner

*Primary Examiner* — Huy Vu
*Assistant Examiner* — Benjamin Lamont

(57) ABSTRACT

A method, medium, and wireless system are provided for scheduling access terminals to prevent starvation of other access terminals connected to a communication network. The wireless system includes access terminals and base stations that are configured with a first wireless scheduler and a parallel wireless scheduler that select access terminals to communicate during specified time slots. The access terminals may measure channel conditions associated with communications to the base station and transmit requests that specify a desired communication rate to the base station. The first and parallel wireless schedulers on each base station receive the requests from each access terminal and select an access terminal to communicate during a subsequent time slot that may be based on, for example, the channel conditions and weighted average functions of the communication rates—corresponding to the access terminal—generated by the first and parallel wireless schedulers.

20 Claims, 5 Drawing Sheets

PARALLEL WIRELESS SCHEDULER

CROSS-REFERENCE TO RELATED APPLICATIONS

This application is a continuation of U.S. application Ser. No. 11/769,558, filed Jun. 27, 2007, which is entirely incorporated by reference.

INTRODUCTION

Wireless systems are configured with channel-aware or channel-unaware wireless schedulers that provide network services to access terminals. The channel-unaware wireless schedulers are configured to ensure fair access to network services by providing equal access to the network services. The channel-unaware wireless schedulers, which do not monitor channel conditions, fail to maximize communication throughput at a base station, because the channel-unaware wireless schedulers may allocate access to an access terminal, when the access terminal is experiencing poor channel conditions and is unable to efficiently communicate with the base station. The channel-aware wireless schedulers overcome the shortcomings of the channel-unaware schedulers by monitoring channel conditions associated with each access terminal connected to the base station. The channel-aware wireless scheduler utilizes data about the channel conditions to schedule access terminals, when the channel conditions of the access terminal may support efficient transmission of communications between the base station and the access terminal.

The channel-aware schedulers maximize base station throughput when compared to the channel-unaware schedulers. However, many schedulers, especially channel-aware schedulers, are not robust when access terminals communicate in a bursty on-off fashion. In the presence of such on-off traffic, these schedulers stop scheduling other access terminals in favor of providing network services to the access terminals that are communicating in the on-off fashion as a way of compensating them for not being scheduled during their off state.

SUMMARY

The present invention is defined by the claims below. Embodiments of the present invention solve at least the above problems by providing a wireless system, a method, and computer-readable media for, among other things, scheduling access terminals in a communication network to reduce starvation while maximizing throughput. The present invention has several practical applications in the technical arts including: scheduling access terminals; and executing a parallel wireless scheduler to prevent starvation of access terminals over a communication network based on, for example, weighted average functions of the communication rate of access terminals.

In a first aspect, a set of computer-useable instructions provides a method to schedule time slots for communications between access terminals and base stations. In accordance with the computer-useable instructions, the base stations receive requests from the access terminals. If channel-aware scheduling is desired, the requests may include a desired communication rate for the access terminals based on the current channel conditions observed by the access terminals. In turn, the base stations execute a first wireless scheduler and a parallel wireless scheduler, which may, for example, use weighted average functions of the communication rate for each access terminal. Based on, among other things, both the first wireless scheduler and the parallel wireless scheduler, the base stations schedule an access terminal for communication. The parallel wireless scheduler reduces or eliminates starvation that results when only the first wireless scheduler is executed by the base stations.

In a second aspect, a wireless system includes base stations and access terminals that communicate over a communication network. Each base station comprises a first wireless scheduler, a parallel wireless scheduler, and a storage. The storage maintains, among other things, variables associated with weighted average functions of the communication rate of each access terminal. The variables are generated by the first wireless scheduler and the parallel wireless scheduler and are re-assigned based on a change of state of one or more access terminals.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide wireless systems, media, and methods for scheduling access terminals to communicate over a communication network. A base station included in the wireless system is configured with a first and a parallel instance of a wireless scheduler. The parallel wireless scheduler reduces or eliminates starvation of access terminals that is caused by other access terminals generating bursty on-off communications, when only the first wireless scheduler is executed in the wireless system. In some embodiments, for example, the first and the parallel wireless schedulers both generate weighted average functions of the communication rate that are utilized by a base station, in the wireless system, to select an access terminal for communication during subsequent time slots.

Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media.

As utilized herein, parallel wireless scheduler is a wireless scheduler component of a base station that executes in parallel with a first wireless scheduler executed by the base station. The parallel wireless scheduler and the first wireless scheduler are similarly configured except the parallel wireless scheduler generates variables to calculate weighted average functions of the communication rate associated with each currently-connected access terminal by assuming each currently-connected access terminal is a communication target.

A wireless system includes base stations, access terminals, and a communication network that connects the base stations and access terminals. In the wireless system, the base stations are configured with wireless schedulers that select time slots to assign to the access terminals. The wireless schedulers may include channel-aware schedulers that select access terminals based on, among other things, channel conditions observed by the access terminals and weighted average functions of the communication rate associated with each access terminal.

Figure 1:
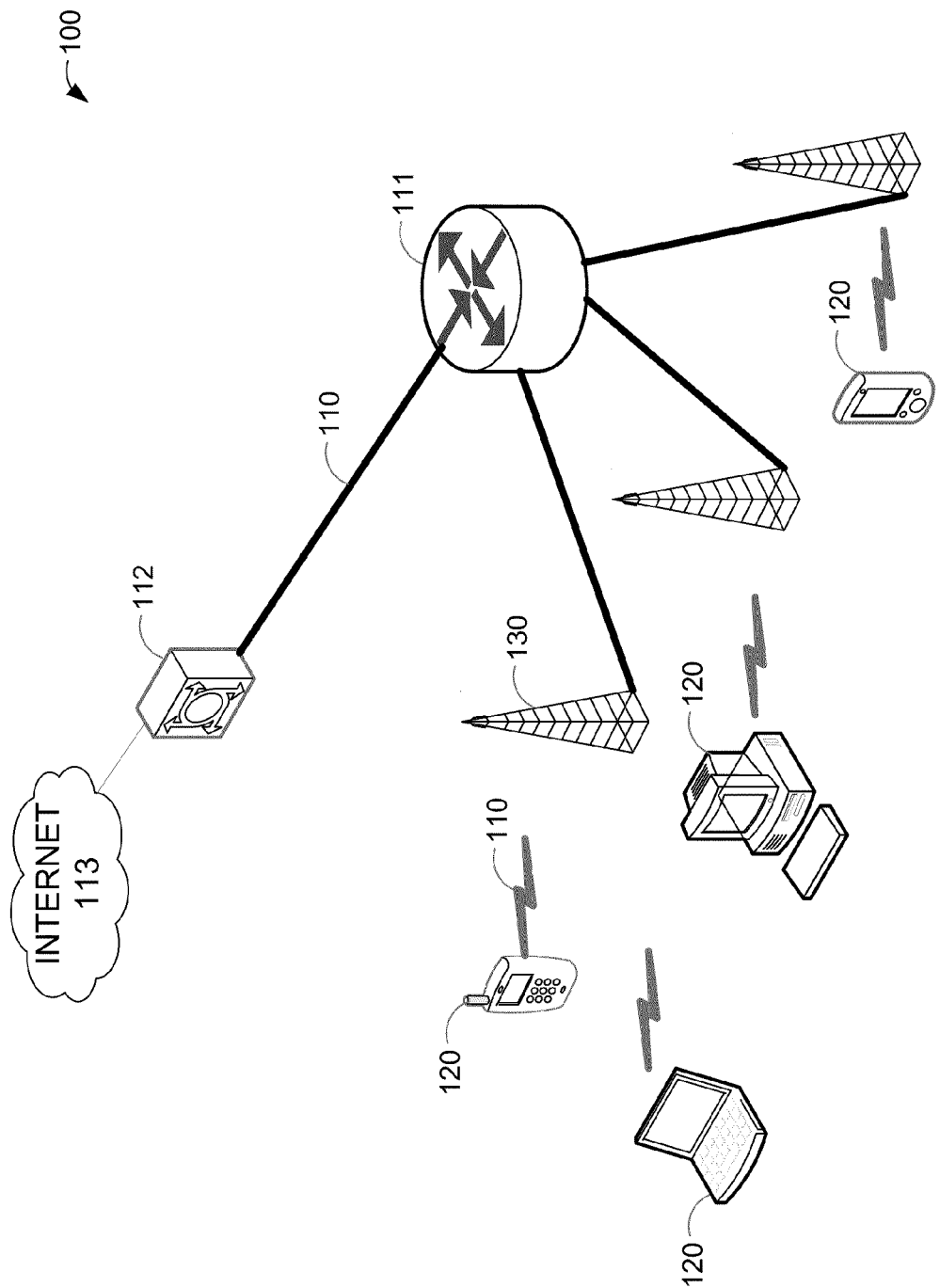
FIG. 1 is an exemplary network diagram that illustrates a wireless system.

FIG. 1 is an exemplary network diagram that illustrates a wireless system 100. The wireless system 100 includes a network 110, access terminals 120, and base stations 130.

The network 110 may include wireless and wired networks. The network 110 comprises router 111, packet data switching node 112, and the Internet 113, or any other network locations. The base stations 130 communicate with the access terminals 120 over the wireless network 110. The base stations 130 connect to the router 111 to route communications received from the access terminals 120 to the Internet 113 and to route communications from the Internet 113 to the access terminals 120. The router 111 connected to the base stations 130 receives communications destined for the Internet 113 or other network locations from the base stations 130 and receives communications destined for the access terminals 120 from the Internet 113. The router 111 forwards the communications to the packet data switching node 112 that is connected to the router 111. The packet data switching node 112 receives and formats the communications and sends the formatted communication to the Internet 113 or any other location specified in the communication and vice versa.

The access terminals 120 are devices that generate or receive communication requests, i.e., voice, video, or data. The access terminals 120 include, but are not limited to, laptops, personal computers, mobile phones, personal digital assistants, smart phones, and other computing devices. In certain embodiments, the access terminals 120 monitor channel conditions on the network 110 and transmit the channel conditions to the base stations 130. The access terminals 120 also transmit requests that specify a desired communication rate to the base stations 130. In certain embodiments, the access terminals 120 periodically use the current channel conditions to send requests for a desired communication rate to the base stations 130.

The base stations 130 receive the communication requests and current channel conditions from the access terminals 120. The base stations 130 are configured with channel-aware and channel-unaware wireless schedulers that select access terminals 120 to communicate in a time slot based on, for example, the current channel conditions, weighted average functions of the communication rate associated with each access terminal, or a number of previous time slots occupied by each access terminal.

In some embodiment, the wireless scheduler treats access terminals that are not the target of any communications similar to access terminals not scheduled in a time slot. For example, the base stations 130 may maintain variables, $A_i[t]$, the weighted average functions of the communication rate associated with each access terminal 120 as: $A_i[t]=(1-\alpha)A_i[t-1]$ when the ith access terminal 120 is not scheduled in slot t or is not the target of any communications; and $A_i[t]=(1-\alpha)A_i[t-1]+\alpha R_i[t]$ when the ith access terminal 120 is scheduled in slot t. In some embodiments, the base stations 130 are configured with storage devices that store the requested communication rate ($R_i[t]$) and the weighted average functions of the communication rate ($A_i[t]$) associated with each access terminal 120. Thus, the wireless scheduler may examine the ratio ($R_i[t]/A_i[t-1]$) for each access terminal 120 to select the access terminal 120 with the largest ratio. In some embodiments, $\alpha$ is a static value or a dynamic value chosen to maximize throughput.

One of ordinary skill in the art appreciates and understands that the wireless system 100 has been simplified and that alternate arrangements are within the scope and spirit of the above description.

Figure 2:
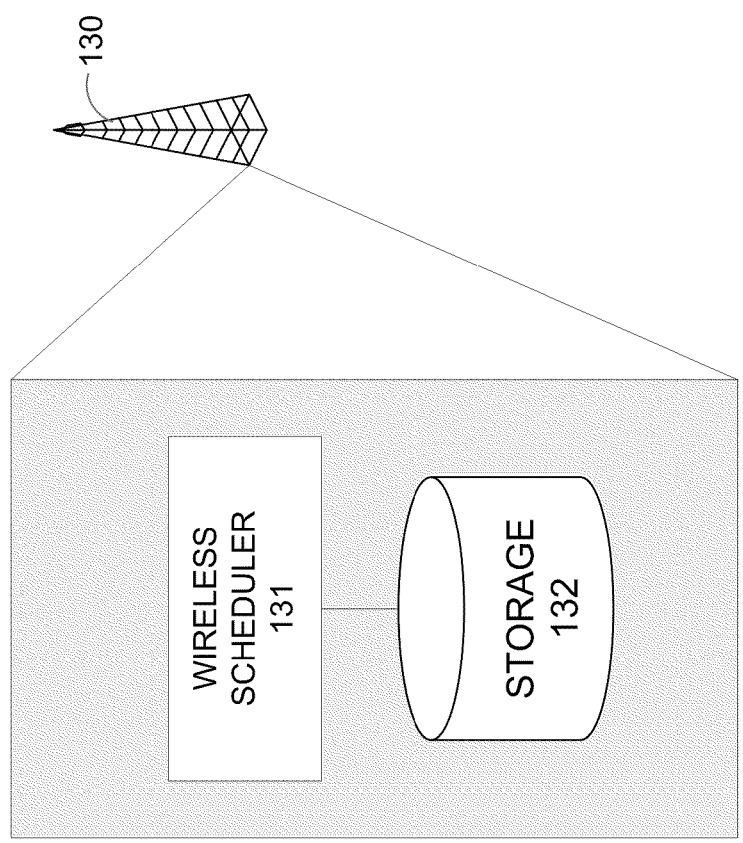
FIG. 2 is an exemplary component diagram that illustrates a base station included in the wireless system of FIG. 1.

FIG. 2 is an exemplary component diagram that illustrates a base station 130 included in the wireless system 100 of FIG. 1. The base station 130 includes a wireless scheduler 131 and storage 132.

The wireless scheduler 131 selects access terminals to communicate during time slots. The access terminal may be selected by the wireless scheduler 131 based on, among other things, the weighted average functions of the communication rate. The wireless scheduler 131 stores, in the storage 132, information for each access terminal, which may include the desired communication rate.

The storage 132 stores data for each access terminal that is connected to the base station 130. The storage 132 includes a database, queue, or any other data structure that stores information for each access terminal. The information stored by the storage 132 may include, but is not limited to, current communication rate, desired communication rate, and weighted average functions of the communication rate and corresponding variables.

Figure 3:
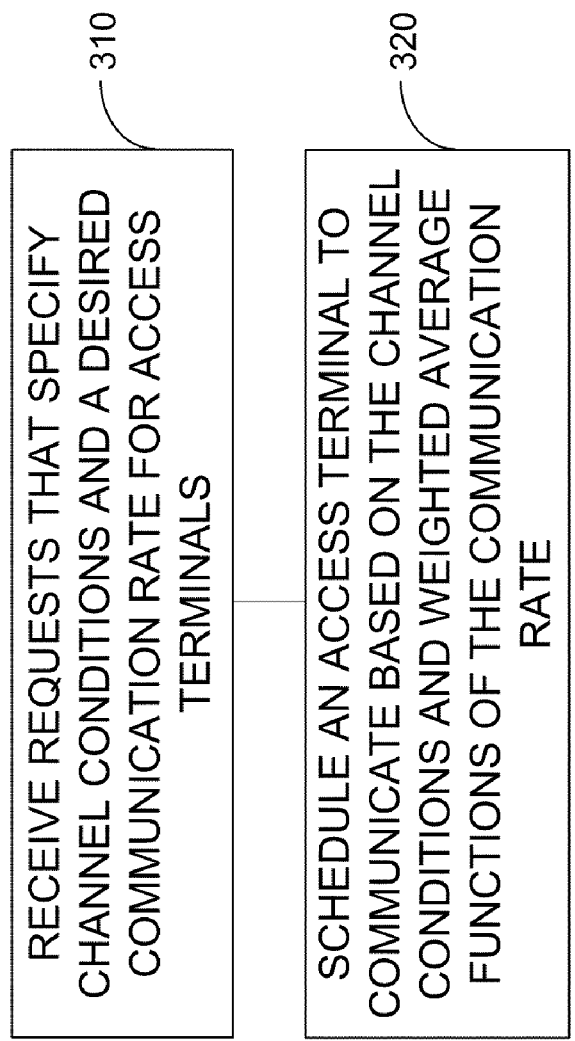
FIG. 3 is an exemplary logic diagram that illustrates a method for scheduling access terminals.

FIG. 3 is an exemplary logic diagram that illustrates a method for scheduling access terminals. Base stations communicate with the access terminals. In step 310, the access terminals may periodically transmit requests that specify a desired communication rate based on the current channel conditions observed by the access terminal. In turn, the base stations schedule an access terminal to communicate during a subsequent time slot based on, for example, the channel conditions and the weighted average functions of the communication rate associated with each access terminal, in step 320. The base station communicates with the scheduled access terminal during the subsequent time slot.

The wireless scheduler at the base stations starve access terminals in the presence of other access terminals receiving bursty on-off traffic because the wireless scheduler tries to compensate for not scheduling access terminals in the off state. The access terminal receiving bursty on-off traffic periodically moves from an on state to an off state based on frequency of the received bursty on-off traffic. To reduce or eliminate such starvation, in certain embodiments, the base stations are configured with a parallel wireless scheduler in addition to the wireless scheduler, i.e., first wireless scheduler. Based on the first wireless scheduler and the parallel wireless scheduler, the base stations schedule and select an access terminal to communicate during subsequent time slots.

Figure 4:
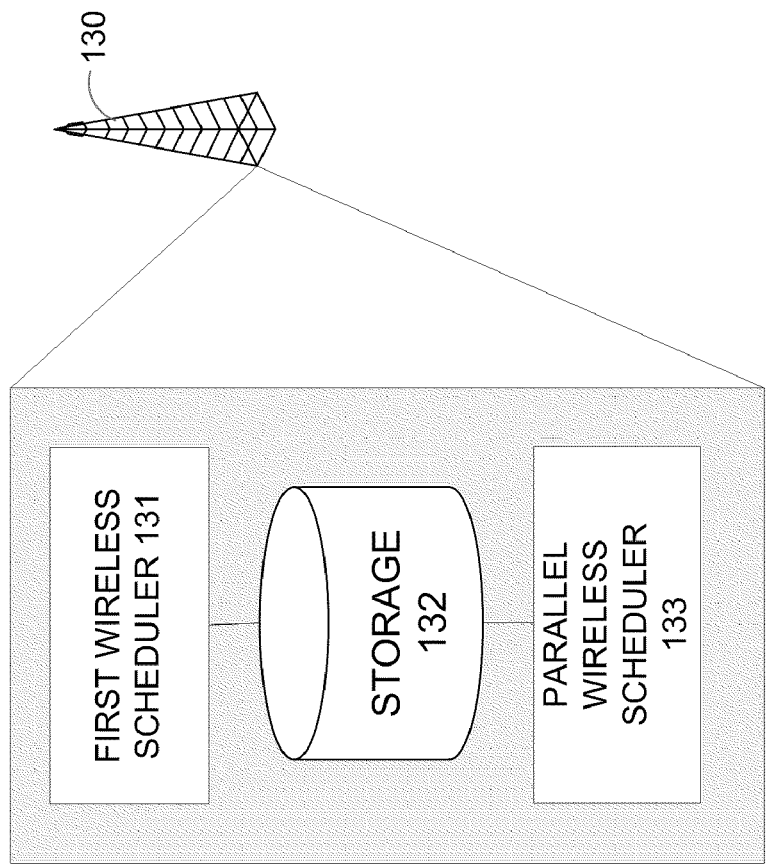
FIG. 4 is another exemplary component diagram that illustrates a base station included in the wireless system of FIG. 1.

FIG. 4 is an exemplary component diagram that illustrates the base station 130 included in the wireless system 100 of FIG. 1. The base station 130 is configured with first wireless scheduler 131, storage 132, and parallel wireless scheduler 133.

The first wireless scheduler 131 is configured to perform all scheduling for each access terminal connected to the base station 130. In each time slot, the first wireless scheduler 131 treats access terminals with no data similar to access terminals that are not scheduled in that time slot. For example, it may generate variables to calculate first weighted average functions of the communication rate $A_i[t]$ for the ith connected access terminal by calculating: $A_i[t]=(1-\alpha)A_i[t-1]$ when the ith connected access terminal is not the target of any communications, or the ith connected access terminal is not scheduled in slot t; or $A_i[t]=(1-\alpha)A_{i[t-1]}+\alpha R_i[t]$ when the ith connected access terminal is scheduled in slot t and $R_i[t]$ is the desired communication rate for the ith connected access terminal. The decision to schedule may be made in a channel-aware fashion such as, for example, choosing the access terminal with the maximum ratio $(R_i[t]/A_i[t-1])$. Alternatively, in some embodiments, the decision to schedule access terminals is made in a channel-unaware fashion. For example, the base station may schedule the access terminal based on a priority associated with the access terminal or a number of previous time slots assigned to the access terminal.

In certain embodiments, the first wireless scheduler 131 stores a flag for each connected access terminal to identify access terminals that contain data for communication, that are targets of communication, or that are scheduled by the base station 130 to communicate during a subsequent time slot. When the flag associated with the connected access terminal is set, the first wireless scheduler 131 increases the first weighted average communication rate for the access terminal. When the flag associated with the connected access terminal is not set, the first wireless scheduler 131 reduces the first weighted average communication rate for the connected access terminal. In other words, the first wireless scheduler generates the first weighted average functions of the communication rate for the ith connected access terminal by evaluating: $A_i[t]=(1-\alpha)A_i[t-1]$ when the flag is not set, which indicates the ith connected access terminal is not the target of communication, the ith connected access terminal does not have data to send, or the ith connected access terminal is not scheduled in slot t. Alternatively, the first wireless scheduler 131 generates the first weighted average functions of the communication rate for the ith connected access terminal by evaluating: $A_i[t]=(1-\alpha)A_i[t-1]+\alpha R_i[t]$ when the flag is set, which indicates the ith connected access terminal is scheduled in slot t and the ith connected access terminal is the target of communication.

The parallel wireless scheduler 133 is similar to the first wireless scheduler 131, except the parallel wireless scheduler 133 assumes all connected access terminals are always the target of communication. With a first wireless scheduler 131 as described above, for example, the parallel wireless scheduler 133 generates variables associated with calculating second weighted average functions of the communication rate $A_i^P[t]$ for all connected access terminals. In each time slot, the access terminal with the highest ratio $(R_i[t]/A_i^P[t-1])$ has its second weighted average functions of the communication rate updated by evaluating $A_i^P[t]=A_i^P[t-1](1-\alpha)+\alpha R_i[t]$. This access terminal may not have data to be the target of communication with the base station. For all other connected access terminals—with data or without data—that do not have the maximum ratio $(R_i[t]A_i^P[t-1])$, the parallel wireless scheduler 133 generates variables for calculating the second weighted average functions of the communication rate by evaluating $A_i^P[t]=A_i^P[t-1](1-\alpha)$. In some embodiments, $\alpha$ is a static value or a dynamic value chosen to maximize throughput.

Thus, the parallel wireless scheduler 133 assumes that all access terminals are always the targets of communication. In the above example, the parallel wireless scheduler 133 generates the second weighted average functions of the communication rate for each access terminal in a manner that is calculated differently from the first weighted average functions of the communication rate. Moreover, when any one connected access terminal goes from an off state back to an on state, the storage maintained by the parallel wireless scheduler 133 is copied to the storage maintained by the first wireless scheduler 131 and the corresponding variables are reassigned. In certain embodiments, the flag associated with each access terminal is checked by the parallel wireless scheduler 133 to determine whether the access terminal is in the on state, i.e. the target of communication, and to reassign the variables. In the above example, the variables associated with first weighted average functions of the communication rate ($A_i[t]$) for each access terminal are assigned the values associated with the variables of the second weighted average functions of the communication rate ($A_i^P[t]$).

The storage 132 is configured to store, among other things, the desired rate of communication, the variables maintained by the first wireless scheduler 131 and the parallel wireless scheduler 133. The parallel wireless scheduler 133 may access the storage 132 to re-assign the variables maintained by the first wireless scheduler 131.

In an embodiment, base stations are configured with the first and parallel wireless schedulers to select access terminals for communication during subsequent time slots. The base stations may receive requests that specify a desired communication rate from the access terminals. The first and parallel wireless schedulers both may use, among other things, channel conditions and desired communication rates to evaluate first and second weighted average functions of the communication rates associated with the access terminals. The access terminal chosen by the first wireless scheduler is scheduled for communication during the subsequent time slot.

Figure 5:
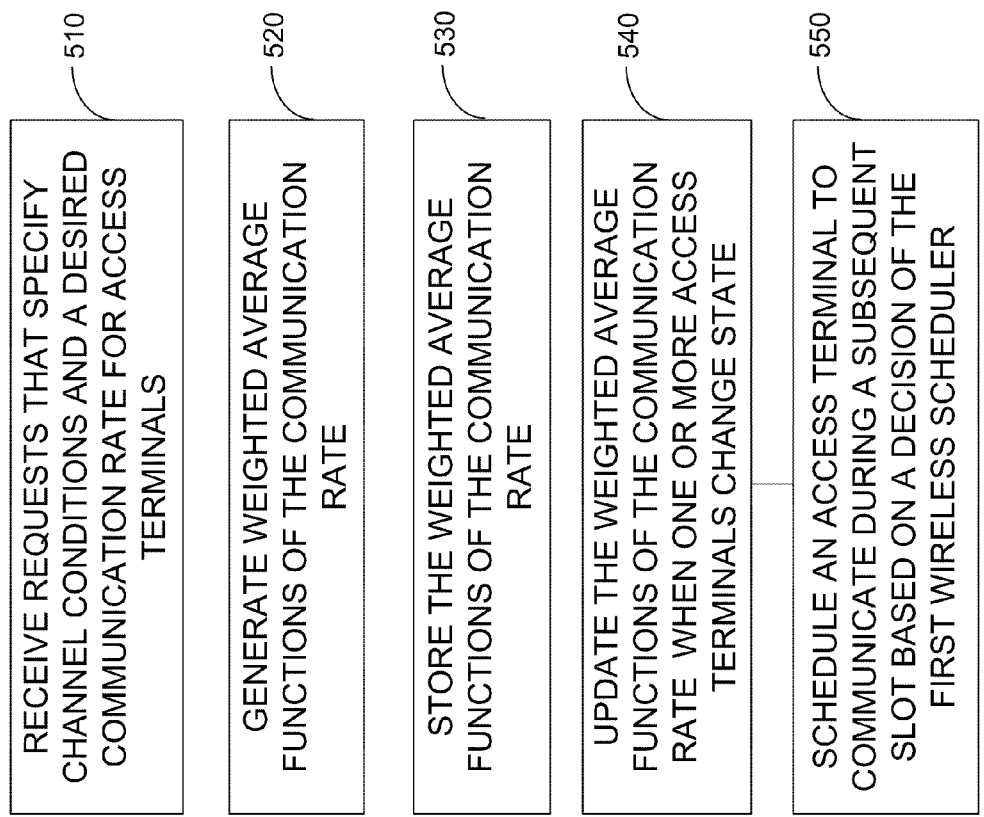
FIG. 5 is another exemplary logic diagram that illustrates a method for scheduling access terminals.

FIG. 5 is an exemplary logic diagram that illustrates a method for scheduling access terminals. Base stations configured with the first and parallel wireless schedulers, communicate with the access terminals to receive communication requests from the access terminals. In step 510, the access terminals may periodically transmit requests that specify a desired communication rate and current channel conditions observed by the access terminal to the base stations. In step 520, the first wireless scheduler updates its variables in storage, which may contain the first weighted average functions of the communication rate in some embodiments, based on the information received in step 510. Similarly, the parallel wireless scheduler also updates its variables in storage, which may be second weighted average functions of the communication rate for each access terminal. In step 530, the first and second weighted average functions for the communication rate are stored in the storage by the base station. In step 540, the variables, for each access terminal, maintained by the parallel wireless scheduler are reassigned to the corresponding variables, for each access terminal, maintained by the first wireless scheduler if at least one access terminal enters an on state after being in an off state. In certain embodiments, all variables for each access terminal are reassigned. In step 550, the base stations schedule an access terminal to communicate during a subsequent time slot based on the decision of the first wireless scheduler that may use, among other things, the channel conditions and the first weighted average functions of the communication rate. The scheduled access terminal communicates with the base station during the subsequent time slot.

In summary, base stations are configured with the first wireless scheduler and an additional parallel wireless scheduler to reduce starvation caused by bursty on-off traffic. The parallel wireless scheduler is used to re-assign the variables maintained by the first wireless scheduler. The first wireless scheduler chooses the access terminal to schedule in each time slot after any necessary re-assignment of its variables by the parallel scheduler.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

The invention claimed is:

1. A wireless system for scheduling access terminals using a network and one or more base stations, the wireless system comprising:
   one or more access terminals that generate and receive communication requests and to monitor channel conditions; and
   one or more base stations in communication with the one or more access terminals, each of the one or more base stations further comprising:
   a first wireless scheduler that selects one or more access terminals for communication during a time slot, based upon one of: i) current channel conditions, ii) a first weighted average function of a communication rate, or iii) previous time slots occupied for each of the one or more access terminals,
   a storage comprising data for each of the one or more access terminals, and
   a parallel wireless scheduler that generates one or more variables associated with calculating a second weighted average function of the communication rate for all of the one or more access terminals connected to the one or more base stations, wherein one or more variables associated with calculating the first weighted average function and generated by the first wireless scheduler are reassigned with some of the corresponding one or more variables generated by the parallel wireless scheduler during a change in state for at least one of the one or more access terminals connected to the one or more base stations.

2. The wireless system of claim 1, wherein some of the one or more variables generated by the first wireless scheduler are reassigned with some of the corresponding one or more variables generated by the parallel wireless scheduler when a connected access terminal goes from an off state to an on state.

3. The wireless system of claim 1, wherein the first weighted average function of a communication rate differs from the second weighted average function of the communication rate.

4. The wireless system of claim 1, wherein the first wireless scheduler stores a flag for each connected access terminal of the one or more access terminals.

5. The wireless system of claim 4, wherein the stored flag identifies access terminals of the one or more access terminals which contain data for communication.

6. The wireless system of claim 4, wherein the stored flag identifies access terminals of the one or more access terminals which are targets of communication.

7. The wireless system of claim 4, wherein the stored flag identifies access terminals of the one or more access terminals which are scheduled to communicate during a subsequent time slot.

8. A method for scheduling access terminals in a wireless base station configured with a processor, the method comprising:
   receiving, by the processor, a request which specifies observed channel conditions and a desired communication rate from one or more access terminals to one or more wireless base stations, each of the one or more wireless base stations comprising a first wireless scheduler, a parallel wireless scheduler, and a storage;
   generating values of a first weighted average function of a communication rate via the first wireless scheduler;
   generating values of a second weighted average function of the communication rate via the parallel wireless scheduler;
   storing the values for the first weighted average function and the second weighted average function in the storage;
   reassigning the values generated by the parallel wireless scheduler to the corresponding values generated by the first wireless scheduler for each of the one or more access terminals upon a change in state of at least one of the one or more access terminals; and
   scheduling an access terminal from the one or more access terminals to communicate during a subsequent time slot via the first wireless scheduler.

9. The method of claim 8, wherein the scheduling occurs after the reassigning.

10. The method of claim 8, wherein the scheduling comprises scheduling an access terminal with a maximum ratio of the desired communication rate to the first weighted average functions.

11. The method of claim 8, wherein the scheduling comprises selecting an access terminal based on a priority associated with the selected access terminal or a number of previous time slots assigned to the selected access terminal of the one or more access terminals.

12. The method of claim 8, wherein the generating values via the parallel wireless scheduler comprises generating values with each of the one or more access terminals currently connected to the one or more base stations.

13. The method of claim 8, further comprising storing a flag in the first wireless scheduler for each of the one or more access terminals currently connected to the one or more base stations to identify the one or more access terminals that contain data for communication, that are targets of communication, or that are scheduled to communicate during a subsequent time slot.

14. The method of claim 13, wherein the first wireless scheduler increases the first weighted average communication rate when the flag associated with one of the currently connected access terminals is set.

15. The method of claim 13, wherein the first wireless scheduler reduces the first weighted average communication rate when the flag associated with one of the currently connected access terminals is not set.

16. The method of claim 8, wherein the parallel wireless scheduler compensates for access terminal starvation periods created by the first wireless scheduler during bursty on-off traffic.

17. The method of claim 8, wherein the first weighted average function is calculated differently from the second weighted average function.

18. The method of claim 8, wherein the reassigning occurs when one of the access terminals connected to the one or more base stations goes from an off state to an on state.

19. The method of claim 8, wherein the parallel wireless scheduler treats all of the one or more access terminals connected to the one or more base stations as a target of communication.

20. The method of claim 8, wherein the reassigning comprises accessing the storage via the parallel wireless scheduler to reassign the values maintained by the first wireless scheduler.

* * * * *